United States Patent
Ray

[15] 3,689,908
[45] Sept. 5, 1972

[54] RATE OF FLOW ALARM

[72] Inventor: Jimmy C. Ray, Route 2, Box 33, Denison, Tex. 75020

[22] Filed: Jan. 4, 1971

[21] Appl. No.: 103,442

[52] U.S. Cl..................340/239 R, 73/209, 250/222, 340/242
[51] Int. Cl.............................................G08b 21/00
[58] Field of Search..........340/239, 242, 248, 228 S; 73/209; 250/218, 222

[56] References Cited

UNITED STATES PATENTS 2,808,580  10/1957  Fuller....................340/239 R
3,436,751  4/1969  Hron et al..............340/248 C
3,533,093  10/1970  Webb.................340/248 R X

*Primary Examiner*—Daniel Myer
*Assistant Examiner*— Daniel Myer
*Attorney*—Charles W. Coffee

[57] ABSTRACT

A tapered-bore rate of flow meter is attached to the tubing connecting a source of dry gas to a telephone cable. A photo cell is attached to the rate of flow meter so if the ball of the flow meter interferes with the light source of the photo cell and a signal is produced. This signal is transmitted to a central point where a plurality of signal carriers are connected to a single alarm system. Thus, an excessive rate of flow into any one of a plurality of cables sets off an alarm.

5 Claims, 4 Drawing Figures

JIMMY C. RAY INVENTOR.

BY
Atty.

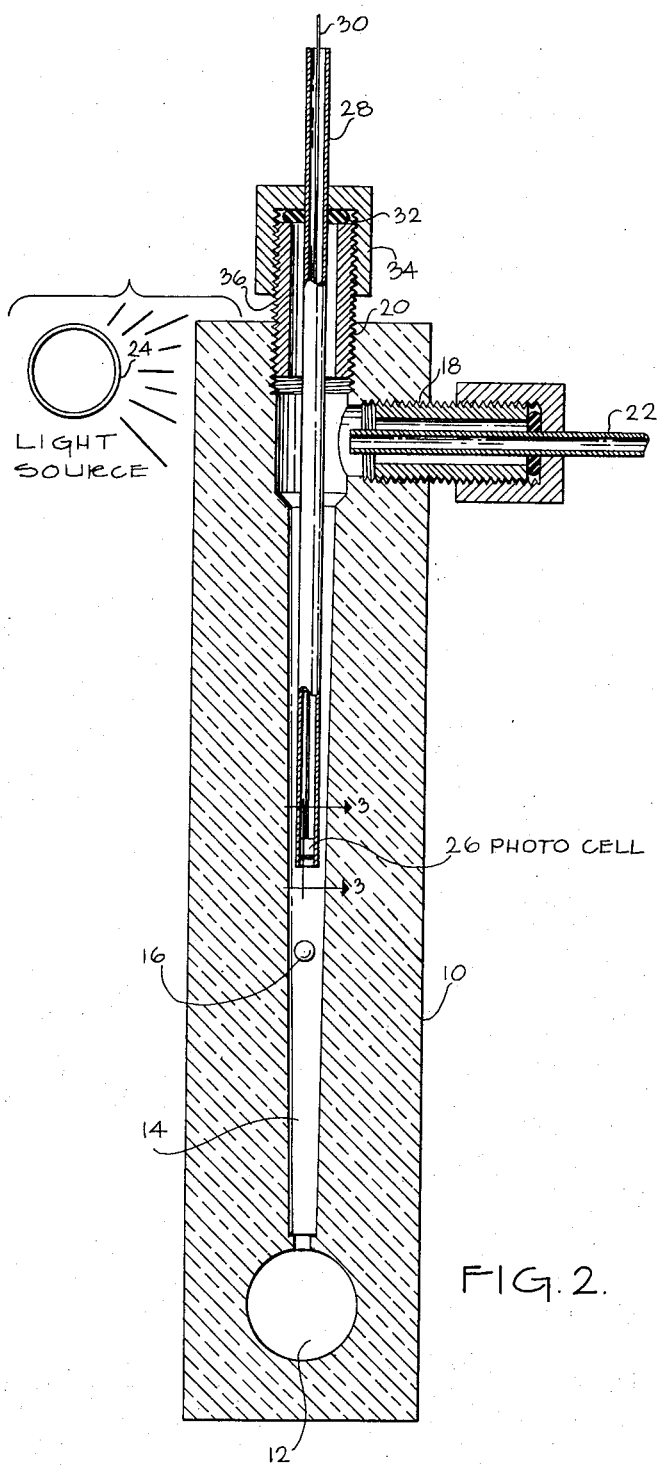
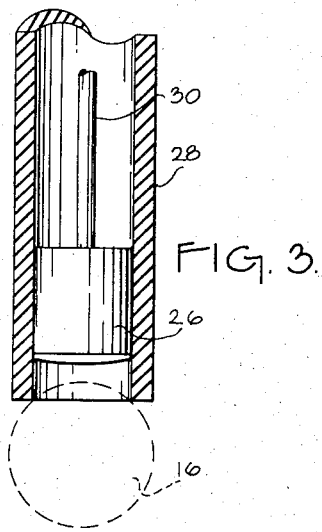
FIG. 2.
FIG. 3.
JIMMY C. RAY — INVENTOR.

JIMMY C. RAY — INVENTOR.

RATE OF FLOW ALARM

BACKGROUND OF THE INVENTION

1. Field of the Invention

This invention relates to telephone communication cables and more particularly to detecting a gas leak in a cable which would indicate excessive loss of dry gas therefrom.

2. Description of the Prior Art

At the present time, most telephone communication cables are located underground. Being located underground, they are subject to moisture and corrosive environment surrounding in the cable. In addition, those that are located above the ground are often subject to corrosive atmosphere, which hinders the signal carrying abilities of the individual conductors within the cable.

Therefore, it is common practice at the present time to pressurize the interior of the cable with a dry gas such as dried air or nitrogen. With the cable carrying a positive pressure dry gas seal upon it, the corrosion of joints and insulation because of moisture or corrosive atmosphere is tremendeously reduced.

However, a problem exists inasmuch as sometimes the shielding or the connections of the cable begin to leak. A gas rate of flow meter is often installed.

The gas rate of flow meters used are of the tapered tube type, having a ball in a tapered tube, i.e., the tube is smaller at the bottom than at the top. Gravity causes the ball to rest at the bottom unless there is a flow of gas; the flow of gas raises the ball. As the space between the ball and the tube is greater the higher the ball, the ball will reach a stable position for any rate of flow of gas.

Normally, in a cable there will be a certain amount of seepage, either through the cable itself or at joints so that there will be a very slow rate of flow. However, in the event of a more serious leak, the rate of flow will increase, causing the ball to rise in the tube. The visual monitoring of the meter is not dependable.

SUMMARY OF THE INVENTION

New and Different Function

I have placed a photo cell on the meter at the height of the ball where the rate of flow would be excessive.

I have found it not desirable to have an alarm for each individual cable and flow meter, but I have found it desirable to connect about 10 of the flow meters in a bank to one alarm. Then, in the event of a leak, the alarm would be given and maintenance personnel would check each of the meters to see which one showed an excess flow. The trouble would then be isolated, the leak found, and corrective measures taken.

Objects of the Invention.

An object of this invention is to improve communications.

Another object is to alarm personnel of gas leaks in pressurized communication cables.

A further object is to detect excessive flow through a flow meter.

Other objects are to achieve the above with a device that is sturdy, compact, durable, lightweight, efficient, simple, safe, versatile, and reliable, yet inexpensive and easy to manufacture, install, adjust, operate, and maintain.

Still further objects are to achieve the above with a method that is safe, rapid, versatile, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING:

FIG. 2 is a sectional view through one meter, showing my invention.

FIG. 3 is an enlarged detailed sectional view of the photo cell with the ball in alarm position shown in dotted lines, taken substantially on line 3—3 of FIG. 2.

DESCRIPTION OF THE PREFERRED EMBODIMENT.

Figure 1:
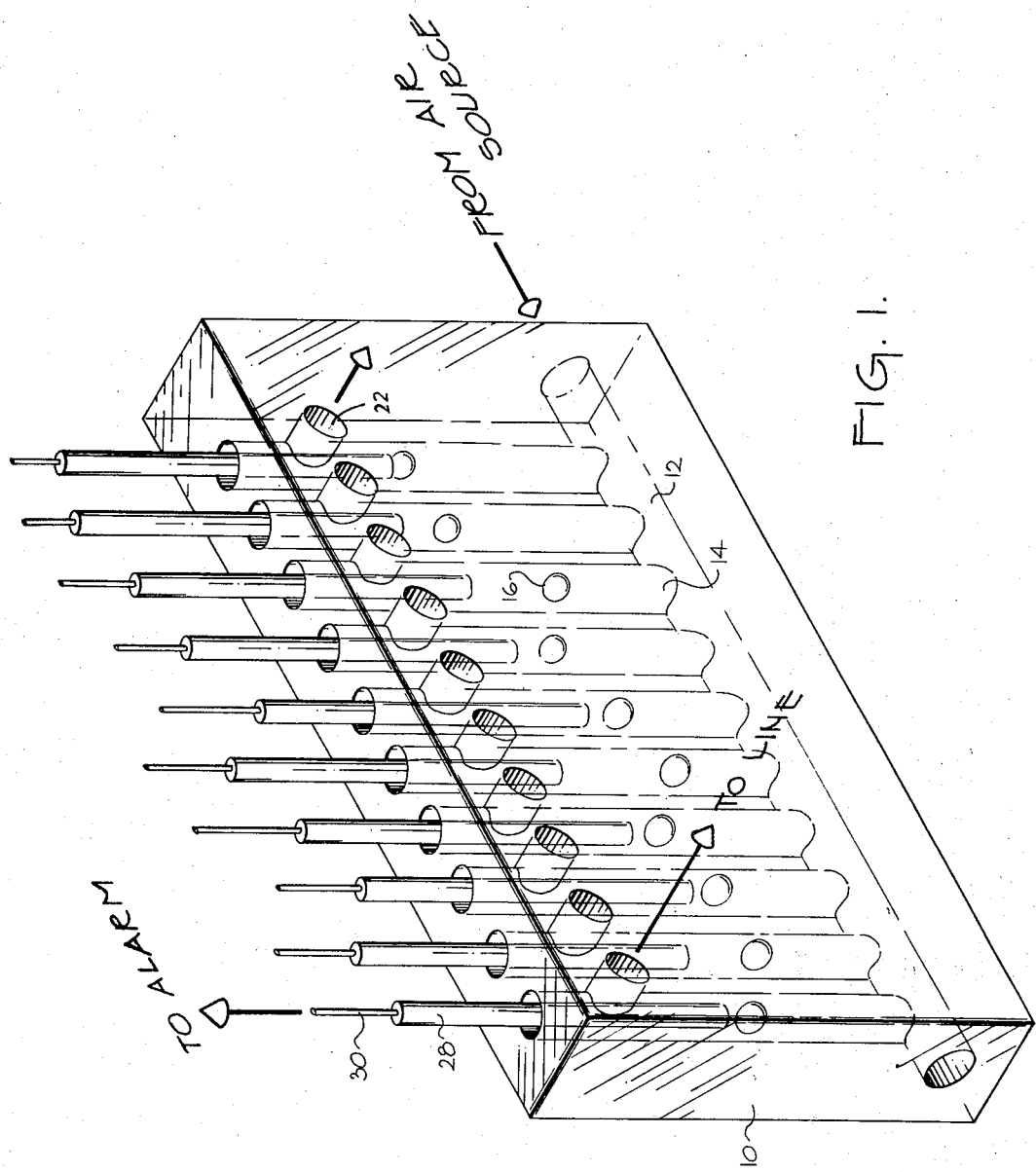
FIG. 1 is a perspective view of a bank of flow meters, somewhat stylized, showing the mounting of the photo cells thereto.

Referring more particularly to FIGS. 1 and 2 of the drawing, it may be seen there represented a block 10 of transparent material such as is commonly available on the market. This block of material has horizontal manifold or header 12 at the bottom. This horizontal header 12 is connected to a source of air. Connected to this header 12 are 10 vertical tapered bores 14. Each tapered bore 14 has ball 16 therein. Horizontal tap 18 and vertical tap 20 are at the top of each tapered bore. Attached to the horizontal tap 18 is conduit or tube 22 which goes to the line or cable.

It will be understood that the structure specifically described above is known and commercially available on the market. I.e., the air compressor or source passes through the bank of flow meters and out through each of the tubes 22, each of the tubes being connected to a cable to maintain a positive dry gas shield upon the cable. As used now, the taps 20 are plugged. Alternatively, according to the individual installation, the horizontal tap 18 may be plugged and the tube to the cable installed in the vertical tap 20.

I have modified this structure by installing light source 24 adjacent to the gas meters and a photo cell 26 adjacent to the position of the ball 16 existing during excessive flow.

The photo cell 26 could be located outside the bank of tubes so that it "views" the ball 16 through the transparent bank 10 in much the same way as the meters are visually read. However, I prefer to insert the photo cell from the top, inside the tube 16 so that excessive flow is determined when the ball 16 rises to a point to shut off the light to the photo cell 26.

Therefore, I have found it convenient to mount the light source 24 close to the block 10 and near the top thereof. Inasmuch as people with ordinary skill in the art are capable of physically mounting a light source such as an elongated incandescent tube lamp adjacent to a given position, the mechanical structure of mounting the light has not been shown.

I have mounted the photocell 26 within a metal tube designated as photo tube 28 to distinguish it from air carrying tube 22. The photo tube 28 is preferrably made of copper or some other conductive material. I have had good success using photo resistors designated as "phototransister TI614" by their manufacturer, Texas Instruments. Transisters of this type are prepared with solder on their exterior surfaces so that application of heat to the outside of the tube 28 causes the transister to be soldered in place inside the tube 28. One electrical connection to the photo cell 26 is provided by the metal of the tube 28 and the other electrical connection by lead 30 attached to the photocell.

The tube 28 is held in place by rubber washer 32 which is clamped between cap 34 screwed upon nipple 36, which is threaded into the vertical tap 20 of each of the tapered bores 14 of the block 10. Therefore, by loosening the cap 34, the position of the photo cell 26 can be adjusted by raising or lowering tube 28 and then after it is placed in position, the cap 34 can be tightened to not only hold the tube in position, but also to insure the gas-tight seal therearound.

As may be seen from the drawing, the gas tube 22 is held in the horizontal tap 18 basically by the same structure. Therefore, for any given line, the ball 16 has a normal position much as shown in FIG. 2, the photo cell 26 may be placed a short distance above it; therefore, if there is an excessive rate of flow, the ball 16 will rise to position as seen in FIG. 3, shutting off the light to the photo cell 26, thus producing a signal in the line 30. Just exactly where the photo cell 26 is positioned is at the control of the operator. Of course, it is desirable that it be positioned so that temporary line surges or difference in temperature between day and night, etc., will not trigger the alarm, but still placed close enough to the normal position of the ball 16 so it serves its function to sound an alarm in case of an actual leak in the line.

Figure 4:
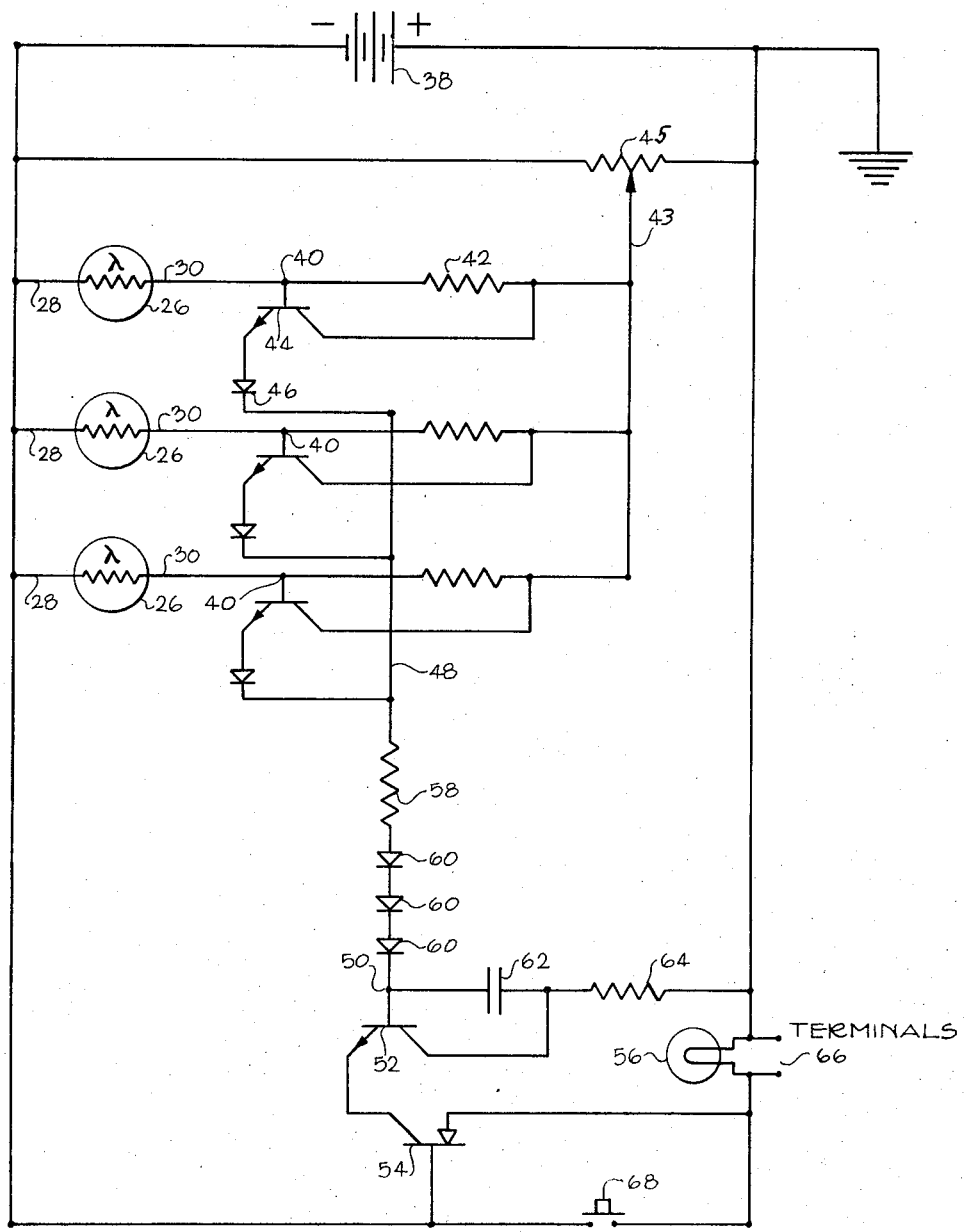
FIG. 4 is the schematic representation of the electrical circuit used.

Although it is believed that those with ordinary skill in the electrical control arts could devise circuits to sound the alarm in the event that ball 16 shuts off the light to any one photo cell 26, I have had good success with the circuit shown in FIG. 4. FIG. 4 is specifically referred to for the connection and relationship of elements, all of which may not be described in detail hereafter.

FIG. 4 shows a source of electrical voltage as battery 38. DC voltage is readily available at central offices of telephone companies. As illustrated, the positive side of the battery 38 is grounded. One side of each of the photo cells 26 are connected by the tube 28 to the negative side of the battery 38. FIG. 4 shows only a bank of three photo cells 26, however, it will be understood by those skilled in the art that additional photo cells 26 could be connected almost without limit. The other side of each photo cell 26 is connected by its lead 30 to a point 40. This point 40 is in each instance connected by resister 42 to tap 43 of potentiometer 45. The potentiometer 45 is connected across the terminals of the battery 38. The photo cells 26 are of the resister type; therefore, it may be seen that if the photo cells 26 have light upon them, they will be of relatively low resistence and the point 40 will be essentially negative. I.e., the voltage between the negative terminal of the battery 38 and the tap 44 will be split between the resisters 42 and photo cells 26 and if the photo cells are conducting, the point 40 will be essentially the same voltage as the negative terminal of battery 38.

With the point 40 negative, there will be no current flow through transister 44 or diode 46 to common line 48. The transister 44 is connected between the point 40 and the tap 44 and the diode 46. The diode 46 is connected between the transister 44 and the common line 48, all as shown in FIG. 4. Therefore, the common line 48 will normally be negative as will common point 50. Therefore, there will be no flow through common transister 52. The common transister 52 is connected to the control lead of controlled silicon rectifier 54. The controlled rectifier 54 will not be conductive; therefore, the signal light 56 will be out.

However, should any one of the balls 16 block the light to any one of the photo cells 26, that photo cell will become non-conductive ( or highly resistant). When this condition occurs, the point 40 will swing positive and then there will be an electrical flow through the transister 44 and the diode 46, causing the common line 48 to become positive. It will be noted that the transisters 44 and the diodes 46 will isolate the line 48 from the other points 40 so that if any single point 40 goes positive, the common line 48 will go positive. This positive condition 48 will be transmitted through common resister 58 and isolation diodes 60 to the common point 50. Also, when the common line 48 goes positive, the common point 50 will not immediately follow and become positive because it is necessary first to change the charge upon capacitor 62. I have found it desirable to design the circuit, particularly the size of capacitor 62, so there is approximately a two second delay between the time a ball closes the light to any photo cell 26 before the point 50 swings sufficiently positive to cause the rectifier 54 to fire. Therefore, any transitory, condition upon the line, such as might be caused by opening or closing valves or the starting of air compressors, will not cause the alarm to be sounded. However, after a 2-second delay and the capacitor 62 changes charge and point 50 goes positive, the transister 52, which is connected between the common point 50, the control rectifier 54 and the connection between resister 64 an capacitor 62. Then when the common transister 52 transmits a signal to the control rectifier 54, then the control rectifier becomes positive and readily conducts electricity from the negative side of the battery 38 through the control light 56 to the positive side of the battery.

As may be seen, the control rectifier 54 is connected between the negative terminal of the battery 38 and the control light 56, which is also connected to the positive side of the battery as is the resister 64. Also, it may be seen that there are a pair of terminals 66 parallel to the signal light 56 by which a signal may be transmitted to a second alarm at some point quite remote from the signal light 56. Therefore, it may be seen that a plurality of banks 10 could be connected to a central panel so that if any line in any one of the banks had an excess rate of flow, an alarm would be sounded at some central panel.

Once the control rectifier 54 becomes conductive, it will continue to be conductive until it is shorted out. Therefore, I have provided re-set switch 68 between the control rectifier 54 and the signal light 56 and the negative terminal of the battery so the alarm may be reset after the control rectifier 54 has become conductive. The re-set switch 68, which is a push button, is also a test switch because when it is closed, the signal light 56 will burn and any alarm connected to terminal 66 will be activated.

Therefore, I have provided a simple system for alarming personnel in the event of a leak in any one of a plurality of cables.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a gas flow meter having
  a. a block of transparent material with
  b. a vertical tapered bore therein,
  c. an opaque ball in the bore,
  d. a gas inlet and outlet to the bore,
  e. means for illuminating the block of transparent material,
  f. a photo cell, and
  g. holding means on the block for holding the photo cell in the tapered bore
  h. so that the position of the ball changes the light upon the cell, thereby
  j. producing a signal output from said photo cell;
  k. the improved holding means for said photo cell comprising in combination with the above
  l. a tube which projects downward into the vertical tapered bore of said flow meter, and
  m. said photo cell being at the bottom of said tube.

2. The invention as defined in claim 1 with the additional limitation of
  n. said tube extending through a seal at the top of aid tapered bore whereby said tube can be raised and lowered to adjust the position at which the photo cell indicates the position of the ball.

3. The invention as defined in claim 2 with the additional limitation of
  o. alarm means connected to said detector for alarming maintenance personnel.

4. The invention as defined in claim 3 with the additional limitations of
  p. a plurality of said flow meters,
  q. one of said detectors on each flow meter,
  r. a wire, and
  s. isolation means on each detector for transmitting the electric signal from the detector to the wire, but preventing the transmission of a signal from the wire to the detector.

5. The invention as defined in claim 4 with the additional limitations of
  t. a network of cables, each cable having a sheath around it,
  u. a source of dry gas,
  v. tubing means connecting each cable to the source of dry gas for pressurizing each cable within its sheath with dry gas,
  w. said flow meter being within the tubing means connecting each cable to its source of dry gas.

* * * * *